(12) United States Patent
Hottinen

(10) Patent No.: US 6,397,073 B1
(45) Date of Patent: May 28, 2002

(54) METHOD OF LOCATING TERMINAL, AND CELLULAR RADIO SYSTEM

(75) Inventor: Ari Hottinen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/540,913

(22) Filed: Mar. 31, 2000

Related U.S. Application Data

(63) Continuation of application No. PCT/FI98/00779, filed on Oct. 2, 1998.

(30) Foreign Application Priority Data

Oct. 3, 1997 (FI) .................................................. 973883

(51) Int. Cl.$^7$ ................................................ H04Q 7/20
(52) U.S. Cl. ...................................... 455/456; 455/457
(58) Field of Search ................................ 455/456, 457, 455/67.7, 67.1

(56) References Cited

U.S. PATENT DOCUMENTS

| | | | | |
|---|---|---|---|---|
| 5,177,685 A | * | 1/1993 | Davis et al. ................. | 364/443 |
| 5,574,466 A | | 11/1996 | Reed et al. ................... | 342/359 |
| 5,732,383 A | * | 3/1998 | Foladare et al. ............. | 701/117 |
| 5,758,264 A | * | 5/1998 | Bonta et al. ................. | 455/67.7 |
| 5,758,313 A | * | 5/1998 | Shah et al. .................. | 701/208 |
| 5,844,522 A | * | 12/1998 | Sheffer et al. .............. | 455/33.1 |
| 5,945,948 A | * | 8/1999 | Buford et al. ............... | 455/456 |
| 5,987,328 A | * | 11/1999 | Ephremides et al. ......... | 455/446 |
| 6,026,304 A | * | 2/2000 | Hisenrath et al. ........... | 455/456 |
| 6,148,211 A | * | 11/2000 | Reed et al. .................. | 455/456 |

FOREIGN PATENT DOCUMENTS

| | | |
|---|---|---|
| EP | 335558 | 10/1989 |
| EP | 631453 | 12/1994 |
| WO | 96/13951 | 5/1996 |

* cited by examiner

Primary Examiner—Daniel Hunter
Assistant Examiner—Thuan T. Nguyen
(74) Attorney, Agent, or Firm—Altera Law Group, LLC

(57) ABSTRACT

The invention relates to a cellular radio system and a method of locating a terminal in a cellular radio system having in each cell at least one base station 104 communicating with the terminals 100 within its area. The base station measures channel parameters from the signals transmitted by the terminals. The coverage area of each base station is modelled by a digital map. To enable accurate localization of the terminals, to each point on the digital map is added a model of the channel parameters of a signal to be transmitted from the point. The channel parameters estimated from the signal of the terminal are compared with the parameters at different points on the map, and the terminal is located on the basis of the comparison.

15 Claims, 3 Drawing Sheets

METHOD OF LOCATING TERMINAL, AND CELLULAR RADIO SYSTEM

This is a continuation of PCT/FI98/00779 filed Oct. 2, 1998.

FIELD OF THE INVENTION

The invention relates to a method of locating a terminal in a cellular radio system having in each cell at least one base station communicating with the terminals within its area, and which base station measures channel parameters from a signal transmitted by the terminals, and in which system the coverage area of each base station is modelled by a digital map.

BACKGROUND OF THE INVENTION

A typical mobile telephone system covers a wide geographical area and comprises several coverage areas, or cells, each being normally served by one base station. A cell size varies greatly, generally according to the volume of traffic within the area. The cells are generally smaller in high traffic density areas than in regions where fewer calls are set up. Irrespective of the cell size, situations often occur in which it is useful to know the geographical location or the direction of travel of a mobile telephone.

Several different methods have been provided in order to determine the geographical location of terminals. The distance between the terminal and the base station communicating with it can be easily determined on the basis of the propagation delay of a signal. One of the most commonly used methods is called triangulation in which three or more base stations measure the signal of the terminal, and the location of the terminal is calculated on the basis of the propagation delay of the signal. However, a problem in the prior art methods, such as the triangulation, is that they cannot detect the location of the terminal very accurately, and, consequently, the location information so obtained cannot be utilized in applications requiring accurate geographical location parameters.

BRIEF DESCRIPTION OF THE INVENTION

An object of the invention is therefore to provide a solution by means of which a terminal can be accurately located and which solves the prior art problems. This is achieved by the method of the type described in the introduction, which is characterized in that to each point on the digital map is added a model of the channel parameters of a signal to be transmitted from the point, and that the channel parameters which are estimated from the signal of the terminal are compared with the parameters of the different points on the map, and the terminal is located on the basis of the comparison.

The invention also relates to a cellular radio system comprising in each cell at least one base station communicating with terminals within its area, and which base station is arranged to measure channel parameters from a signal transmitted by the terminals, and in which system the coverage area of each base station is modelled by a digital map. The cellular radio system of the invention is characterized in that the system comprises means for maintaining the digital map, in which means information is added about a channel parameter estimate of a signal to be transmitted from each point on the digital map, and that the system comprises the means for comparing the channel parameters estimated from the signal of the terminal with the parameters estimated at different points on the map, and means for locating the terminal on the basis of the comparison.

The invention is based on the idea that when a terminal is situated at different locations within a coverage area, the channel parameters, such as the impulse response, of the signal of the terminal vary depending on the location. Modern computers can profile the geographical location by digital maps to which it is possible to add information about buildings, routes and geography within the area, for example. It is possible to make these maps to the desired accuracy. Naturally, the more accurate the map, the large amount of computer capacity required in its processing. In the solution of the invention, information is added to each point on the map about the types of channel parameters typically included in the signal that is transmitted by the terminal situated at the point. In a preferred embodiment of the invention, the means for maintaining the map and performing calculation are situated in the base station, although they can also be situated in some other parts of the system.

The method and system of the invention provide many advantages. The location of the terminal can be accurately determined. When less accurate prior art localization methods are used as initial values, the accurate location of the terminal can be determined rapidly by the method of the invention. The accurate location information of the terminal so obtained can be utilized in applications requiring accurate geographical location parameters.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
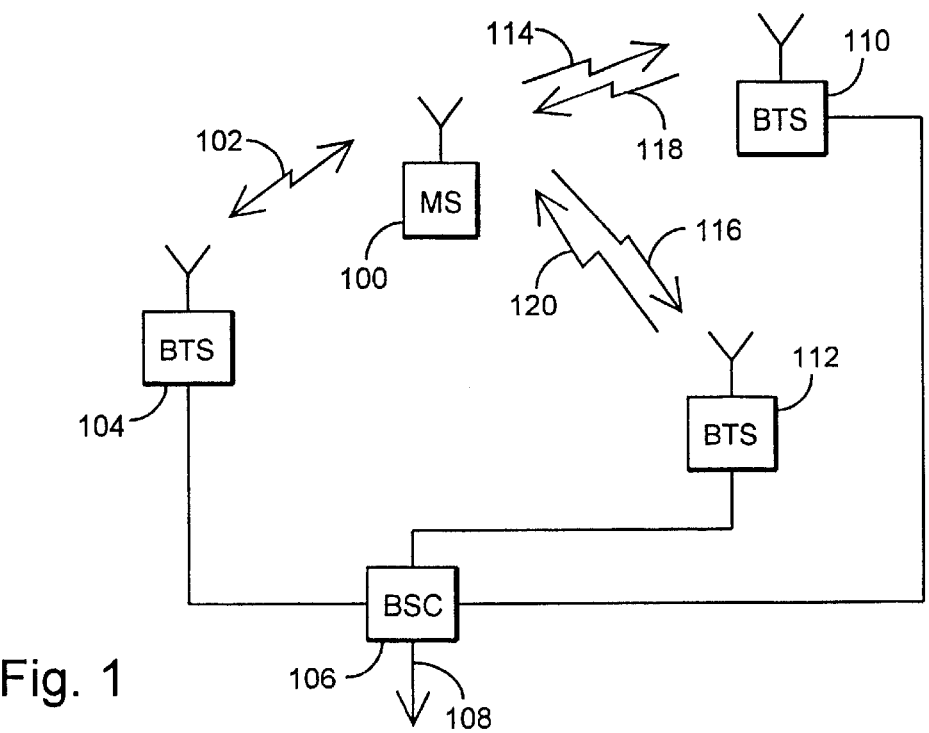
FIG. 1 illustrates a cellular radio system to which the method of the invention can be applied.

The method of the invention is suitable for use in any cellular radio system in which a base station measures the channel parameters, such as the impulse response, of the signal of a terminal. The impulse response measured in each base station can also be two-dimensional, in which case the time spread and the directions of arrival of the signals are estimated. In addition, the channel parameters include the dynamics of the impulse response, which can be modelled by the Doppler spread, for example. Let us first study FIG. 1 illustrating an example of a cellular radio system to which the method of the invention can be applied. The figure presents a subscriber terminal 100 having a bidirectional connection 102 with a base station 104 that forwards terminal traffic via a base station controller 106 to other parts of a network 108. The example of the figure also presents two other base stations 110 and 112. These base stations do not have an actual traffic channel connection with the terminal 100, but they can nevertheless receive a signal 114, 116 transmitted by the terminal and measure the distance from the terminal to the base station by means of the signal. Correspondingly, the terminal can receive a signal 118, 120, for example a pilot signal, from the base stations and determine the distance to these base stations. By means of the three base stations 104, 110 and 112 the terminal can be roughly located by means of the prior art methods, and this information can be used as an initial value of the method of the invention.

In the solution of the invention, the coverage area of each base station is modelled by a digital map Digital maps have previously been used for specifying base station coverage areas and, consequently, cell sizes in connection with the installation and modification operations of-a cellular radio network system. The maps comprise information about buildings, routes and terrain obstructions within the area, from the viewpoint of radio waves.

Figure 2:
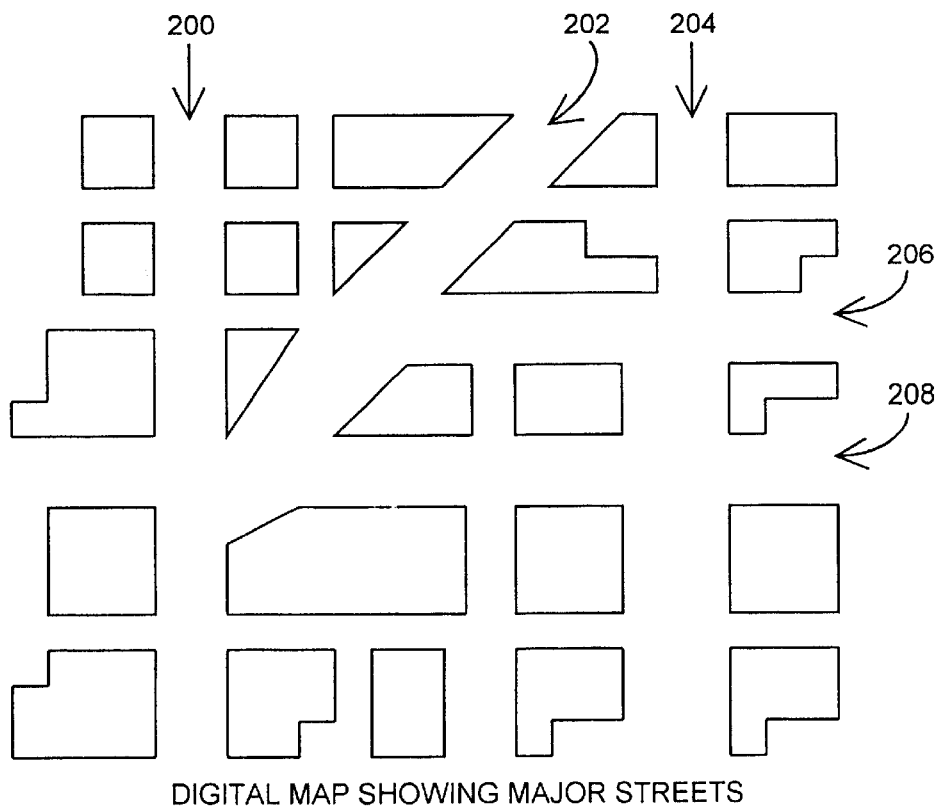
FIG. 2 shows an example of a digital map.

FIG. 2 illustrates an example of part of a simplified digital map. The figure shows a section of the layout of a town, its buildings and streets. Naturally, the actual digital map often comprises a much wider area and may also comprise other information besides the layout. In the solution of the invention, the map may comprise information about the maximum speed in all or major streets 200 to 208, for example.

In the solution of the invention, information is added to each point on the digital map about the types of channel parameters typically included in the signal that is transmitted by the terminal situated at said point. In a preferred embodiment of the invention, a method known as ray tracing is used for estimating the channel parameters, i.e. typically the impulse response, of the signal to be transmitted from each point on the digital map. The ray tracing method is a simulation calculation method known to those skilled in the art, which method is particularly used in telecommunication applications for planning a cellular network. The channel parameters at each point on the digital map can be predetermined and stored in a memory table. In the localization of the terminal, the parameters estimated from the signal of the terminal are compared with the values in the memory.

In an alternative embodiment of the invention, the channel parameters at each point on the digital map are experimentally determined in such a way that a test transmitter is disposed in turn to each point on the map and the base station measures the signal parameters. The measurement results are stored in the memory table. Naturally, the method is in that case more difficult to implement, but may come in useful when the ray tracing results are found unreliable.

Figure 3:
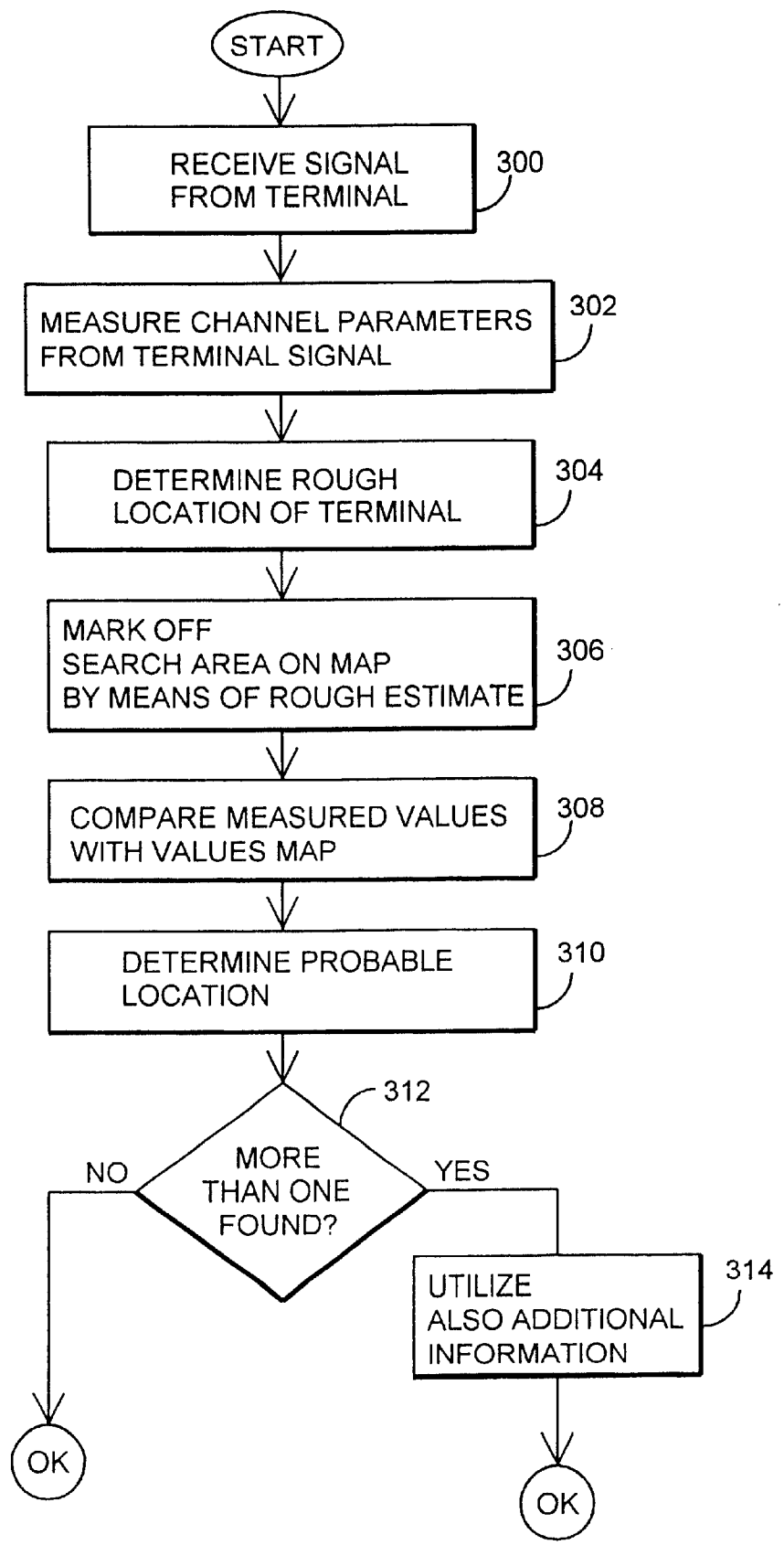
FIG. 3 is a flow diagram illustrating the method of the invention.

Let us next study the method of the invention by means of a flow diagram presented in FIG. 3 and also with reference to FIG. 1. First, the base station 104 receives a signal from the terminal 100 in phase 300. In phase 302, the base station 104 measures the channel parameters, i.e. typically the impulse response from the signal. In addition, the base station may estimate the direction(s) of arrival of the signal(s). Next, the base stations 110 and 112 estimate the rough location of the terminal 100 by using the prior art methods. Next, in phase 306, one or more smaller areas are marked off on the map on the basis of the rough location estimate, the close search being directed to these marked-off areas.

Next, in phase 308, the values measured from the received signal are compared with the values found on the map by means of a suitable distance criterion. Since all parameters are bound by the location (x,y), a feasible criterion can be presented as follows:

$$(x^-,y^+)=\mathrm{argmin}_{(x,y)\in(X,Y)}D(y(t;x,y),y_{meas}(t)),$$

where D is a suitable distance, for example the euclidean distance, y(t; x,y) comprises the impulse response model of the direction of arrival of the signal and of the location (x,y) to be searched, and $y_{meas}$ comprises the measured channel parameters.

In phase 310, the probable location of the terminal is determined on the basis of the comparison. The map may, of course, include multiple locations with equal parameters. This is checked in phase 312. If only one location with the corresponding parameters is detected, the search can be concluded. If more than one location was detected, the terminal can be located by means of information about the previous locations of the terminal. Furthermore, the speed of the terminal can be used in the localization, provided that the digital map comprises information about the typical speeds of the routes of the base station and that the base station estimates the speed of the terminal from the signal of the terminal. In phase 314, a conclusion can be drawn between the detected locations on the basis of the information.

Figure 4:
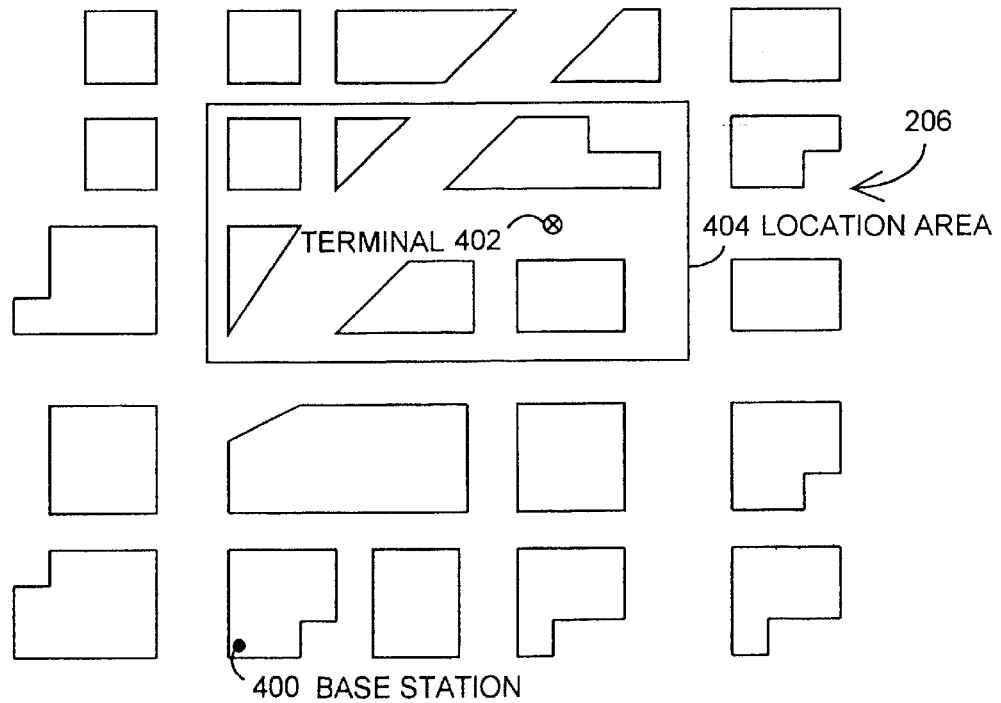
FIG. 4 is a map illustrating the method of the invention.

Let us further study FIG. 4 illustrating an example of part of a simplified digital map. Let us assume that a base station is situated at a point 400 and a terminal communicating with the base station is situated at a point 402. In other words, the base station receives a signal from the terminal and measures the channel parameters of the signal in the same manner as described above. Furthermore, the base station roughly locates the terminal possibly by means of other base stations (not shown in the figure), the location area being illustrated in the figure with a marked-off area 404. The base station carries out a closer search within the area 404 on the digital map. If more than one feasible location area is detected for the terminal, the base station may then utilize, for example, information showing the maximum speed in a street 206 and also indicating that the terminal was situated at a certain known point in connection with the previous measurement. Using this information, the base station is able to locate the terminal more accurately.

Figure 5:
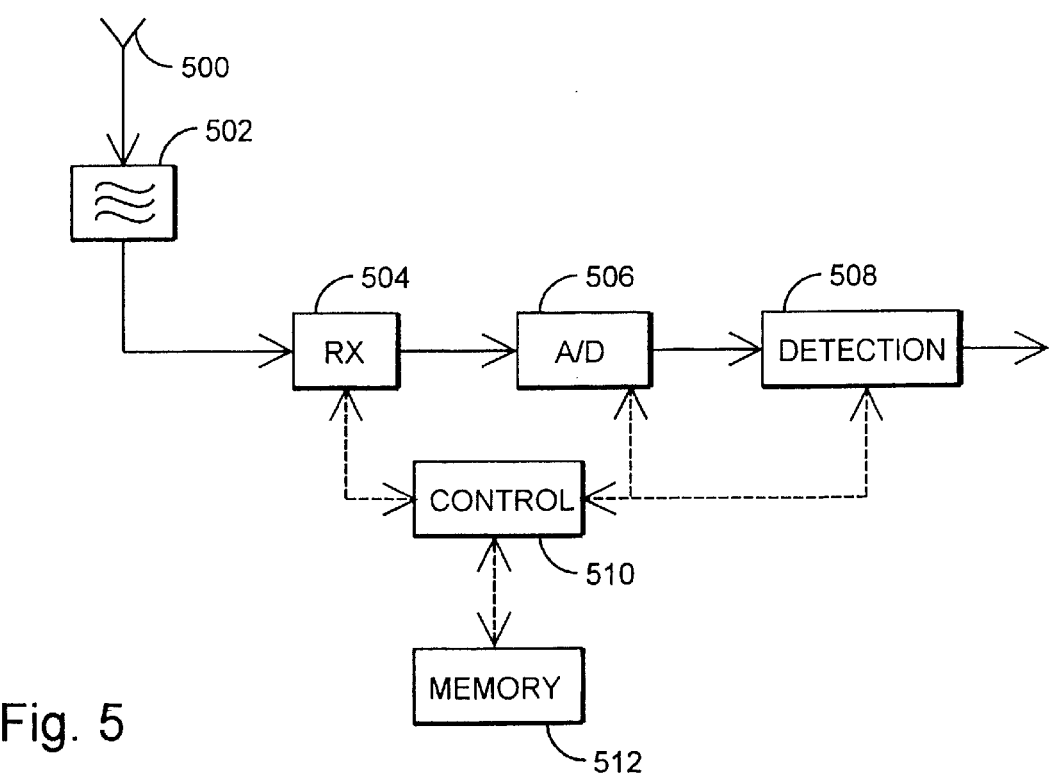
FIG. 5 is a block diagram illustrating the structure of a reception part of the base station of the system according to the invention.

In a preferred embodiment of the invention, the means for implementing the method of the invention are situated in the base station. In the solution of the invention, the means may also be situated in some other parts of the system, in the base station controller, for example. Let us next study FIG. 5 showing a block diagram that illustrates the structure of a base station of the system according to the invention from the viewpoint of reception. The base station comprises an antenna 500 for receiving a signal from a terminal. The signal received by the antenna is applied via a filter 502 to radio frequency parts 504 transmitting the signal from a radio frequency to a base band or to an intermediate frequency. The signal so obtained is forwarded to an A/D converter 506 converting the signal into digital form by sampling it according to the prior art. The sampled signal is forwarded to detection means 508 estimating the channel parameters, such as the impulse response, and detecting the signal. The base station further comprises a control unit 510 controlling the operation of the other blocks. The control unit is typically implemented by a processor or by discrete logic circuits and software.

Besides the control means 510, the base station of the system of the invention comprises memory means 512 maintaining a digital map and including information about the channel parameter estimate of the signal to be transmitted from each point of the digital map. The map also includes information about the position of buildings, other obstructions and streets within the coverage area of the base station. The memory means can be implemented by ordinary memory circuits operating under the control of the control unit. The control unit 510 of the base station compares the channel parameters that are estimated from the signal of the terminal with the parameters that are estimated at different points on the map which is in the memory means 512, and locates the terminal on the basis of the comparison.

The control means 510 of the base station of the system are able to determine the channel parameters at each point on the digital map by the ray tracing technique and to store the values in the memory means 512. The actual calculation can also be carried out in an external computer that is possibly used by several base stations, and the values can be transferred to the memory means of the base station.

The terminal 100 of the system is arranged to measure in accordance with the prior art the intensity and time delay of the signals received from different base stations. The terminal 100 and the base station 104 are arranged to determine a rough location estimate of the terminal on the basis of the measurement results. The most accurate initial estimate is obtained if the measurement results of both the terminal and the base station are simultaneously utilized.

The base stations 110, 112 of the system, which are closest to the terminal 100, are arranged to measure in accordance with the prior art the intensity and time delay of the signal received from the terminal, and the base station 104 is arranged to determine a rough location estimate of the terminal on the basis of the measurement results, and the control means 510 and the memory means 512 of the base station 104 use the rough estimate in locating the terminal 100.

Although the invention is described above with reference to the example according to the accompanying drawings, it is obvious that the invention is not restricted thereto, but it can be modified in many ways within the scope of the inventive idea disclosed in the attached claims.

What is claimed is:

1. A method of locating a terminal in a cellular radio system having in each cell at least one base station communicating with the terminals within its area, comprising:
   measuring channel parameters from a signal transmitted by the terminal, wherein measured channel parameters comprise information about the impulse response of the received signal,
   modeling the coverage area of each base station by a digital map,
   adding a model of channel parameters to each point on the digital map,
   locating the terminal by comparing measured channel parameters with the model of channel parameters at the different points on the map.

2. A method as claimed in claim 1, wherein the digital map comprises information about the position of buildings, other obstructions and routes within the coverage area of the base station.

3. A method as claimed in claim 1, wherein the model of channel parameters at each point on the digital map are predetermined and stored in a memory, and in the localization of the terminal, the measured channel parameters are compared with the values in the memory.

4. A method as claimed in claim 3, wherein the model of channel parameters at each point on the digital map are determined by means of the ray tracing technique.

5. A method as claimed in claim 2, wherein the model of channel parameters at each point on the digital map is experimentally determined in such a way that a transmitter is disposed at the point on the map, and the base station measures the parameters of the signal.

6. A method as claimed in claim 1, wherein in the comparison, information is utilized about the direction of arrival of the signal of the terminal.

7. A method as claimed in claim 1, wherein the terminal measures the channel parameters of the signals received from different base stations, and that the terminal and the base station determine a rough location estimate of the terminal on the basis of the measurement results, and that the rough estimate approximation is used in locating the terminal.

8. A method as claimed in claim 1, wherein the base stations closest to the terminal measure the channel parameters of the signal received from the terminal, and that the rough location estimate of the terminal is determined on the basis of the measurement results, and that the rough estimate is used in locating the terminal.

9. A method as claimed in claim 1, wherein in the localization of the terminal, information is utilized about the previous locations of the terminal.

10. A method as claimed in claim 1, wherein the digital map comprises information about the typical speeds of the routes of the base station, and that the base station estimates the speed of the terminal on the basis of the signal of the terminal, and that the speed of the terminal is used for the localization.

11. A cellular radio system comprising in each cell at least one base station communicating with terminals within its area, comprising:
    a circuit to measure channel parameters from a signal transmitted by the terminals, wherein the parameters comprise information about the impulse response of the received signal,
    a digital map wherein the coverage area of each base station is modeled and a model of channel parameters is added at each point on the digital map, and
    a circuit for comparing the measured channel parameters with the model of channel parameters at different points on the map to determine the location of the terminal.

12. A system as claimed in claim 11, wherein the base stations of the system maintain the digital map comprising information about the position of buildings, other obstructions and routes within the coverage area of the base station.

13. A system as claimed in claim 11, wherein the base stations of the system determine the model of channel parameters at each point on the digital map by means of the ray tracing technique.

14. A system as claimed in claim 11, wherein the terminal of the system is arranged to measure the intensity and time delay of the signals received from different base stations, and that the terminal and the base station are arranged to determine a rough location estimate of the terminal on the basis of the measurement results, and that the base station comprises the means for using the rough estimate in locating the terminal.

15. A system as claimed in claim 11, wherein the base stations of the system which are closest to the terminal are arranged to measure the intensity and time delay of the signal received from the terminal, and that the base station is arranged to determine the rough location estimate of the terminal on the basis of the measurement results, and that the base station uses the rough estimate in locating the terminal.

\* \* \* \* \*